United States Patent [19]

Turcotte et al.

[11] 4,085,323

[45] Apr. 18, 1978

[54] CALIBRATOR FOR RADIOACTIVITY WELL LOGGING TOOLS

[75] Inventors: Ronald E. Turcotte, West Redding, Conn.; Robert H. Hunt-Grubbe, Devizes, England

[73] Assignee: Schlumberger Technology Corporation, New York, N.Y.

[21] Appl. No.: 736,607

[22] Filed: Oct. 28, 1976

[51] Int. Cl.² .................... G01D 18/00; G21G 4/06
[52] U.S. Cl. ............................ 250/252; 250/493; 250/494; 250/496
[58] Field of Search .............. 250/252, 493, 494, 496

[56] References Cited

U.S. PATENT DOCUMENTS

| | | | |
|---|---|---|---|
| 2,945,129 | 7/1960 | Swift et al. | 250/252 |
| 3,215,837 | 11/1965 | Hall, Jr. | 250/252 |
| 3,435,215 | 3/1969 | Pritchett | 250/252 |
| 3,449,575 | 6/1969 | Smith | 250/493 |
| 3,581,095 | 5/1971 | Ransohoff et al. | 250/494 |

*Primary Examiner*—Archie R. Borchelt

[57] ABSTRACT

A radioactivity logging tool including a gamma ray detector is field calibrated with the help of a sleeve that has a radioactive material distributed therein and is clamped about the tool so as to completely surround the detector. The radioactive material is peferably uranium 238. It can be either distributed uniformly inside the sleeve or take the form of wires which extend along generatrices or circumferences of the sleeve.

24 Claims, 7 Drawing Figures

CALIBRATOR FOR RADIOACTIVITY WELL LOGGING TOOLS

BACKGROUND OF THE INVENTION

The present invention relates to radioactivity well logging and is particularly directed to methods and apparatus for calibrating radioactivity well logging tools. The invention is particularly useful for calibrating logging instruments that measure the natural radioactivity of earth formations.

The surveying of earth formations by detection of the natural radioactivity of said formations is presently well known and in widespread use. Such surveying is generally accomplished by moving a radiation detector through a well bore and establishing a record of the natural gamma radioactivity as a function of the borehole depth. This record can then be used to determine the interfaces between different formations, to relate formations observed from one borehole with formations in the same field that have been observed from other boreholes, and to provide depth references within a borehole.

It is also presently well known to detect the natural radioactivity of an earth formation within several appropriately selected energy windows and to combine the measured count rates in each window in order to determine the amounts of uranium, thorium and potassium present in the formation. The technique is described in U.S. Pat. No. 3,976,878, issued Aug. 24, 1976 to P. Chevalier et al. and assigned to the assignee of the present invention.

The natural gamma radioactivity of earth formations can further be used to provide quantitative shale indications. Typically, the count rate that reflects the natural radioactivity of a formation is normalized to a standard natural gamma radiation count rate observed in pure shale. The normalized signal is then considered as reflecting the shale concentration. Such a technique is disclosed in U.S. Pat. No. 3,786,267 to O. Y. Liu et al., issued Jan. 15, 1974 and assigned to the assignee of the present invention.

The use of natural radioactivity measurements to compare radioactive levels between wells, to determine the concentrations of uranium, thorium and potassium and to provide quantitative shale measurements requires that the instruments for performing such measurements be accurately calibrated.

Before being sent to the field, a natural radioactivity well logging instrument may be calibrated in a pit which simulates an earth formation and is made of concrete or cement blocks containing known amounts of uranium, thorium and potassium. The radioactive zone is thick enough to appear infinite to gamma ray detectors. Typically, the thickness of the pit wall is set at two feet.

Field calibration of the natural radioactivity logging tools is generally accomplished by placing a standard gamma ray source (typically of radium 226) at a standard distance (typically 53 inches) from the detector and adjusting the gain of the system so as to obtain a predetermined reading on a measuring apparatus. Unfortunately, the accuracy of this calibration technique is strongly affected not only by the asymmetry of the detector but also, and chiefly, by a scattering effect due to the tool itself and to its surroundings (drill pipes, catwalks, etc.) that also receive gamma rays which may be redirected toward the detector. As a consequence of these effects, the calibration errors may reach 10%. Consequently, although natural gamma ray logging has been used by the oil industry for more than thirty years, natural radioactivity logs have never been in widespread use for quantitative measurements. A need exists, therefore, for a more accurate field calibration of the natural radioactivity logging tools. It must also be mentioned that the calibration sources now in use are relatively strong (100μCi) and can therefore be health hazards.

The calibration pit described hereinbefore avoids both the undesired scattering effect from nearby objects and the errors due to the asymmetry of the detector, but it is obviously not portable and therefore cannot be used as a field calibrator. It must be added that the purpose of a calibration pit is to simulate an earth formation, whereas the purpose of a particular field calibrator is to produce a specified count rate in the tool in which it was designed to check that the detection system is performing satisfactorily.

It is therefore an object of the present invention to provide novel methods and apparatus for more accurately calibrating in the field a natural radioactivity logging tool or, more generally, any radioactivity logging tool having a radiation detector.

SUMMARY OF THE INVENTION

In accordance with the invention, a well logging tool including a radiation detector is field calibrated with the help of a sleeve which has a radioactive material distributed therein and which is clamped about the tool so as to completely surround the detector.

More specifically, the sleeve is made in two conveniently hinged parts which preferably conform to the shape of the tool and allow positioning around the tool. The radioactive material can be in the form of wires which extend along generatrices or circumferences of the sleeve. The radioactive material can also be distributed uniformly inside the sleeve, for example in the form of a powder dispersed within a layer of epoxy.

If the sleeve is used for calibrating a natural radioactivity logging tool, the radioactive material it contains is advantageously selected so as to have an energy distribution similar to that of the earth formations which will be investigated by the tool.

It appears quite clearly that, as the radioactive source is brought very close to the detector and surrounds it completely, the scattering effect from nearby objects and the errors due to the asymmetry of the detector are avoided. An accurate field calibration of the tool can thus be performed. Furthermore, the source can be made considerably weaker than the calibration sources now in use, which are at a relatively long distance from the detector. Health hazards are therefore reduced.

The present invention, together with further characteristics thereof, may best be understood by reference to the following description taken in conjunction with the accompanying drawings.

DESCRIPTION OF THE PREFERRED EMBODIMENTS

Figure 1:
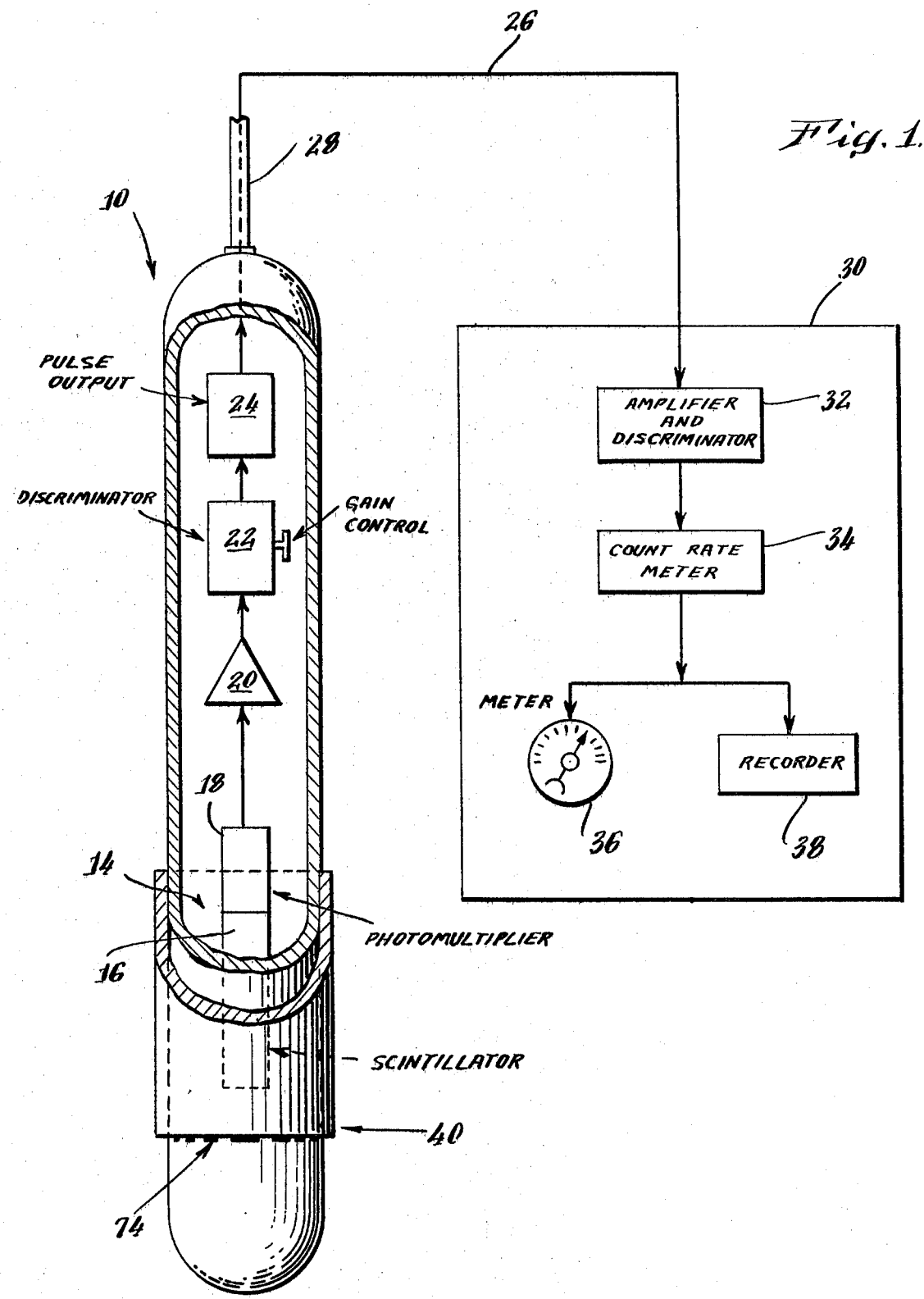
FIG. 1 is a schematic representation of a natural radioactivity well logging tool having a calibrator of the invention positioned around its detector.

FIG. 1 shows a logging tool 10 for measuring the natural radioactivity of earth formations, comprising an elongated fluid and pressure-tight housing 12. Within the housing 12, a scintillation detector 14, that includes a scintillator crystal 16 and a photomultiplier 18, responds to the natural gamma radioactivity of the adjacent formation. Other radiation detectors, such as a solid state germanium, cadmium telluride, or mercuric iodide detector, also may be used.

The output pulses of the photomultiplier 18 are first amplified in an amplifier 20 before being applied to a pulse height discriminator circuit 22 that passes only pulses above a selected amplitude in order to eliminate most of the spurious signals caused, for example, by "dark current" within the photomultiplier 18. These pulses are then prepared in a pulse output circuit 24 for transmission, through a conductor 26 in an armored cable 28, to surface equipment 30.

In the surface equipment 30, the incoming pulses are received by an amplifier and discriminator circuit 32 and applied to a count rate meter 34 that converts the received pulses into an output signal corresponding to the natural gamma radioactivity registered at the detector 14. This signal is applied simultaneously to a meter 36 and a trace recorder 38.

During field operations, the above-described logging tool has to be periodically calibrated at the well site by adjusting the gain of the detection system so as to keep a constant count rate reading on the meter 36 when a calibrator containing a standard gamma ray source is placed at a reference position with respect to the detector 14. The gain adjustment can be performed by adjusting with a gain control 39 either the high voltage source of the photomultiplier 18 or the amplifier 20 or, as shown in FIG. 1, the discriminator 22.

As can be seen from FIG. 1, the calibrator of the present invention is in the form of a sleeve 40 that has a radioactive material distributed therein and is clamped around the portion of the housing 12 containing the detector 14. The sleeve extends above and below the scintillator 16 and has an internal diameter which is substantially the same as the housing diameter (typically 3-⅜ inches). If L represents the length of the scintillator (typically 12 inches) the sleeve length is preferably between 1.5L and 2L. The sleeve, which is advantageously made of steel or aluminum, must be thin enough to have a relatively low weight that makes it convenient to manipulate, but thick enough not to be easily damaged. Typically, though not necessarily, the sleeve thickness is between 1/20 and 1/10 of its internal diameter for materials such as steel or aluminum.

The radioactive material distributed inside the sleeve has preferably an energy spectrum that approximates the energy spectrum of the formations which will be investigated by the tool. Uranium 238 constitutes a most appropriate source material, as its half-life is $10^5$ years and its radiation spectrum is similar to that seen by the detector in rocks. However, several other source materials can be used, such as radium 226, cobalt 60, cesium 137 or any radioactive substance emitting in the same range as the formations of interest.

FIGS. 2a-b, 3a-b and 4a-b illustrate three preferred embodiments of the calibrator of the invention. In each case the sleeve 40 is made in two semi-cylindrical parts which are conveniently hinged to allow positioning around the tool. Hinges 42 and fasteners 44 have been therefore schematically represented in the figures.

Figure 2B:
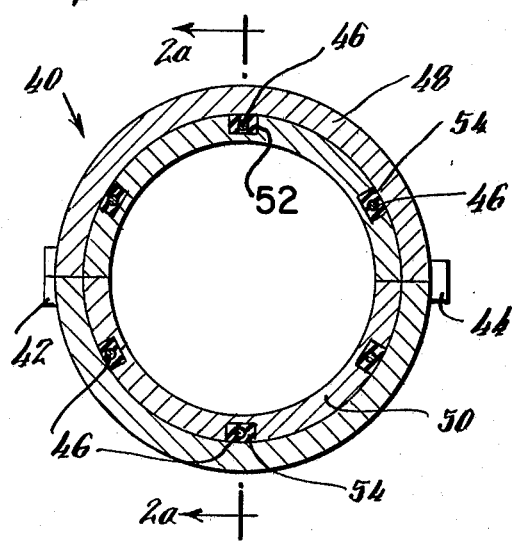
FIGS. 2a and 2b show a first embodiment of the invention.
Figure 2A:
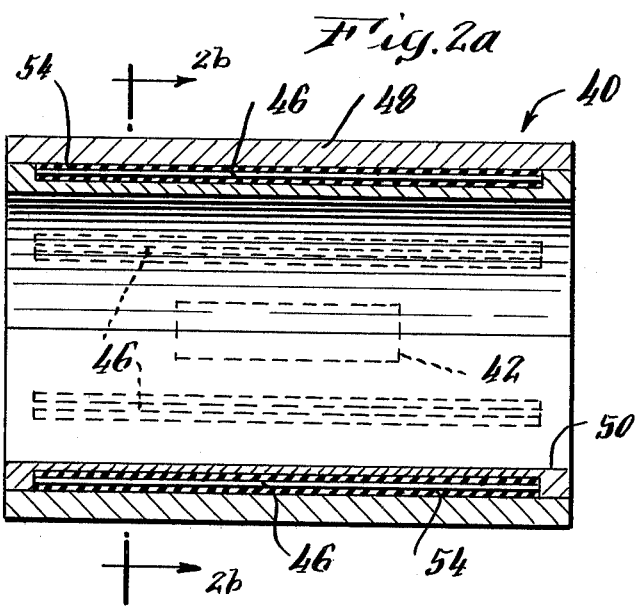

As can be seen from FIGS. 2a and 2b, the radioactive material is in the form of several wires 46 which extend along generatrices of the sleeve 40. The wires 46 can be introduced into predrilled axial holes, but as the drilling of such holes in the sleeve wall may not be very easy, each half-sleeve is preferably made of two concentric half-tubes 48 and 50, the internal tube comprising grooves 52 which are distributed axially about its inside surface and are slightly shorter than the sleeve. The radioactive wires 46 and thus placed inside the grooves 52 before the two half-tubes are welded or otherwise fastened together. The wires 46 are preferably embedded in a sheath of epoxy 54 inside the grooves. This sheath protects the wires against oxidation. Alternatively, the source material could be placed inside the grooves 52 in the form of a powder dispersed within epoxy.

Figure 3B:
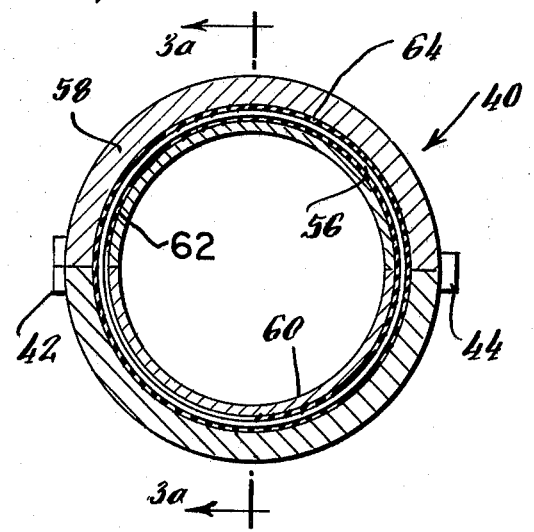
FIGS. 3a and 3b show a second embodiment of the invention.
Figure 3A:
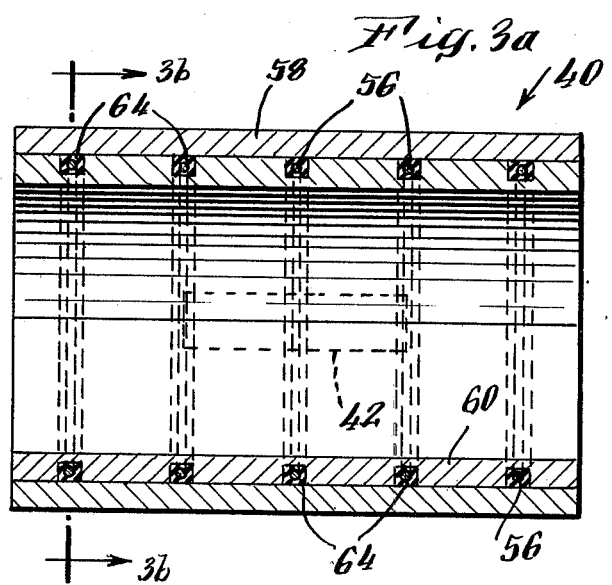

In accordance with another preferred embodiment of the invention represented in FIGS. 3a and 3b, the radioactive material is in the form of circular wires 56 which are now distributed circularly inside the sleeve 40. Each half-sleeve is also made up of two concentric half-tubes 58 and 60. The internal tube comprises circular grooves 62 that contain the radioactive wires 56, preferably embedded in a protective sheath of epoxy 64. Alternatively, the source material can be placed inside the grooves 62 in the form of a powder dispersed within epoxy.

Figure 4B:
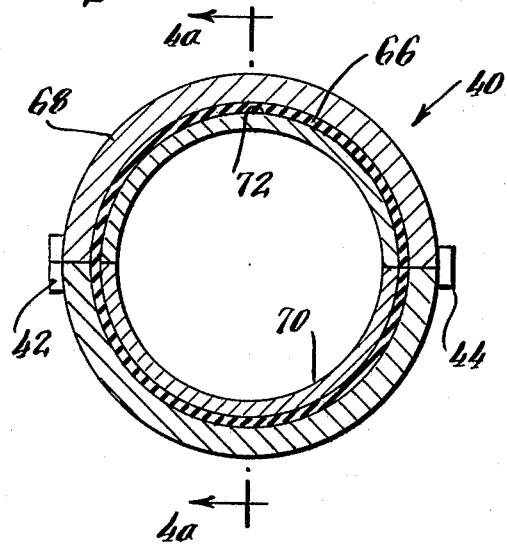
FIGS. 4a and 4b show a third embodiment of the invention.
Figure 4A:
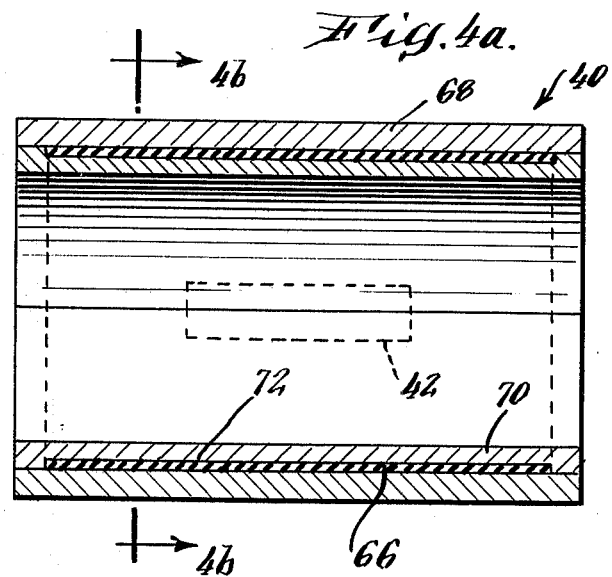

In accordance with still another preferred embodiment represented in FIGS. 4a and 4b, the source material 66 is uniformly distributed inside the sleeve 40. In this case, each half-sleeve is made of two concentric half-tubes 68 and 70, which are welded together. The internal tube comprises a hollow 72 which is slightly shorter than the sleeve and contains the source material 66 in the form of either a powder dispersed within a suitable medium, such as epoxy, or a chemical product dissolved in a paint. Alternatively, the source material can be deposited electrolytically in the hollow 72.

The amount of radioactive material introduced into the sleeve is determined, in each case, so as to produce the desired count rate reading on the meter 36 when the tool is functioning properly.

As the calibrator is close to the detector, a very small amount of radioactive material is needed. As an example, an 18-inch long sleeve containing six wires of uranium 238 (as depleted uranium), each with a 0.01 inch diameter and a strength of 1$\mu$Ci will provide approximately the same reading as a 100$\mu$Ci pill of the same material used at 53 inches from the detector. There is practically no health hazard from a 1$\mu$Ci source.

In operation the sleeve 40 is simply clamped around the housing 12 and the gain control 39 is adjusted so as to obtain the desired reading on the meter 36. Marks 74 can be advantageously provided on the housing to show the exact position of the sleeve around the detector. Since the calibrator is as close as possible to the detector and surrounds it completely, the scattering effects from nearby objects and the errors due to the asymmetry of the detector are mitigated. An accurate calibration of the tool can thus be performed.

The calibrator of the invention may have a slight screening effect on the background radiation that is normally received by the detector. Although the percentage of background screened by the sleeve is generally very low (2%), it may be suitable to measure the screening effect. For that purpose, a "passive" sleeve, exactly identical to the radioactive sleeve but containing no source, can be used.

While there have been described what are at present considered to be preferred embodiments of this invention, it will be obvious to those skilled in the art that various changes and modifications may be made therein without departing from the invention, and it is therefore intended that the following claims cover all such changes and modifications as fall within the true spirit and scope of the invention. It is obvious, for example, that instead of being distributed axially or circularly, the radioactive material could be distributed both axially and circularly, thus forming a grid inside the sleeve or form a spiral or a matrix of dots or points.

We claim:

1. A portable calibrator for radioactivity logging tools having a substantially cylindrical housing adapted to be moved in a borehole and a radiation detector carried by said housing, said calibrator comprising a sleeve arranged to encircle the portion of said housing that carries the radiation detector, and a radioactive material distributed inside said sleeve.

2. The calibrator of claim 1 wherein the internal diameter of said sleeve is substantially the same as the housing diameter.

3. The calibrator of claim 1 wherein the length of said sleeve is about 1.5 to 2 times the length of the radiation detector.

4. The calibrator of claim 1 wherein the thickness of said sleeve is about 1/20 to 1/10 of its internal diameter.

5. The calibrator of claim 1 wherein said sleeve is made of two hinge-connected substantially semi-cylindrical parts to allow clamping of the parts about the housing.

6. The calibrator of claim 1 wherein said radioactive material is in the form of wires.

7. The calibrator of claim 6 wherein said wires extend along generatrices of the sleeve.

8. The calibrator of claim 6 wherein said wires extend along circumferences of the sleeve.

9. The calibrator of claim 6 wherein said sleeve is made of two concentric tubes, one of which comprises grooves for containing the wires of radioactive material.

10. The calibrator of claim 6 wherein said wires are embedded in a protective substance.

11. The calibrator of claim 1 wherein said radioactive material is uniformly distributed inside the sleeve.

12. The calibrator of claim 11 wherein said radioactive material is in the form of a powder dispersed within a support medium.

13. The calibrator of claim 11 wherein said radioactive material is in the form of a chemical product dissolved in a paint.

14. The calibrator of claim 11 wherein said radioactive material is in the form of an electrolytic deposit.

15. The calibrator of claim 11 wherein said sleeve is made of two concentric tubes, the uniformly distributed radioactive material being disposed between said tubes.

16. The calibrator of claim 1, wherein said radioactive material has an energy distribution that approximates the energy distribution of the radiation emitted by an earth formation.

17. The calibrator of claim 1 wherein said radioactive material is selected from the group of uranium 238, radium 226, cobalt 60 and cesium 137.

18. The calibrator of claim 1 wherein said sleeve is made of aluminum.

19. The calibrator of claim 1 wherein said sleeve is made of steel.

20. A portable calibrator for radioactivity logging tools having a substantially cylindrical housing and a radiation detector inside said housing, said calibrator comprising:
a metallic sleeve adapted to be clamped about the portion of said housing that contains the radiation detector, said sleeve being made up of two hinge-connected semi-cylindrical parts that each comprise two concentric half-tubes, one of which has grooves distributed about its inside surface; and
a radioactive material disposed in said grooves.

21. The calibrator of claim 20 wherein said grooves extend along generatrices of the sleeve.

22. The calibrator of claim 20 wherein said grooves extend along circumferences of the sleeve.

23. A portable calibrator for radioactivity logging tools having a substantially cylindrical housing and a radiation detector inside said housing, said calibrator comprising:
a metallic sleeve adapted to be clamped about the portion of said housing that contains the radiation detector, said sleeve being made of two hinge-connected semi-cylindrical parts that each comprise two concentric half-tubes; and
a radioactive material distributed uniformly between said half-tubes.

24. A method for field-calibrating a radioactivity logging instrument having a radiation detector and means connected to said detector for producing a reading of the amount of detected radiation, said method comprising:
positioning around said detector a sleeve having a radioactive material distributed therein; and
adjusting said producing means to give said reading a predetermined value.

* * * * *